A. E. WALTON.
COFFEE OR TEA POT STRAINER.
APPLICATION FILED JAN. 26, 1910.

987,516.

Patented Mar. 21, 1911.

Witnesses

Inventor
Anna E. Walton.
By
Attorneys

UNITED STATES PATENT OFFICE.

ANNA E. WALTON, OF CLARE, IOWA.

COFFEE OR TEA POT STRAINER.

987,516.  Specification of Letters Patent.  Patented Mar. 21, 1911.

Application filed January 26, 1910. Serial No. 540,227.

*To all whom it may concern:*

Be it known that I, ANNA E. WALTON, a citizen of the United States, residing at Clare, in the county of Webster, State of Iowa, have invented certain new and useful Improvements in Coffee or Tea Pot Strainers; and I do hereby declare the following to be a full, clear, and exact description of the invention, such as will enable others skilled in the art to which it appertains to make and use the same.

The invention relates to a coffee or tea pot strainer and more particularly to the class of adjustable strainers for pots or the like.

The primary object of the invention is the provision of a strainer in which the coffee grounds or substance may be confined and retained without mixing with the fluid contained in the pot so that the latter will be free of leaves and sediment when discharged from the pot or the like.

Another object of the invention is the provision of a strainer which is adjustable so as to enable the same to receive varying quantities of tea or coffee and that is capable of being placed within and removed from a pot and when within the pot will maintain the fluid clear and free from leaves or sediment.

A further object of the invention is the provision of a strainer of this character which is simple in construction, thoroughly reliable and efficient and inexpensive in the manufacture.

With these and other objects in view, the invention consists in the construction, combination, and arrangement of parts, as will be hereinafter more fully described, illustrated in the accompanying drawings, disclosing the preferred form of embodiment of the invention and as pointed out in the claim hereunto appended.

Figure 1:
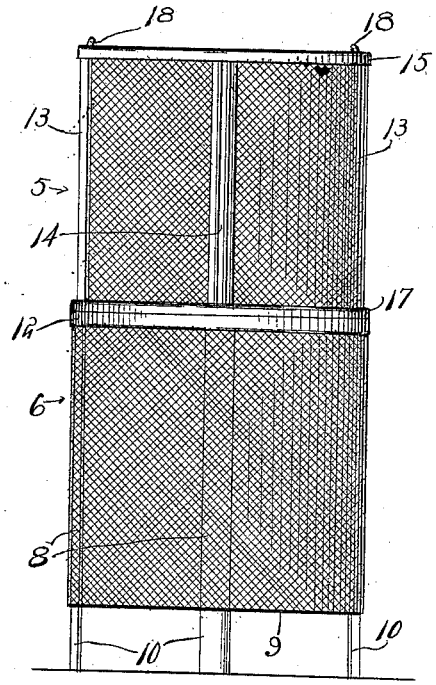
Figure 3:
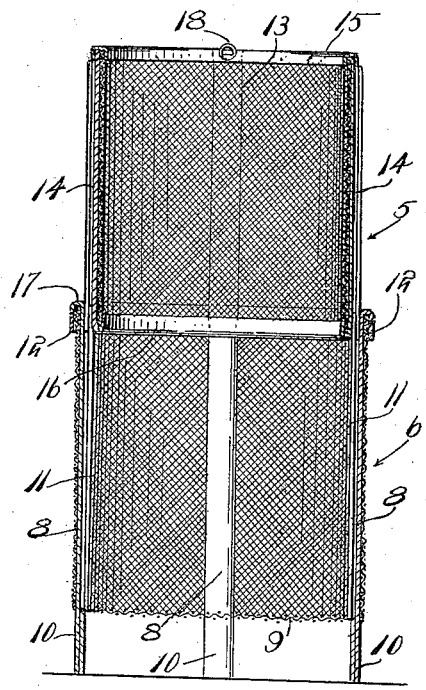
Figure 2:
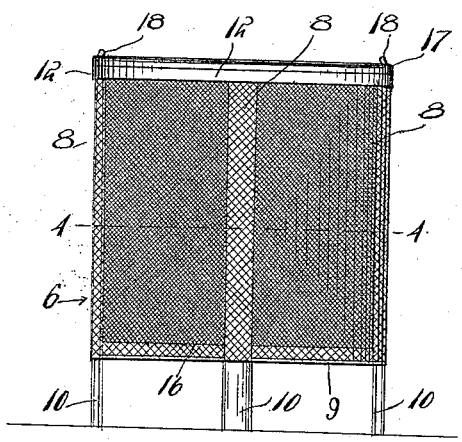
Figure 4:
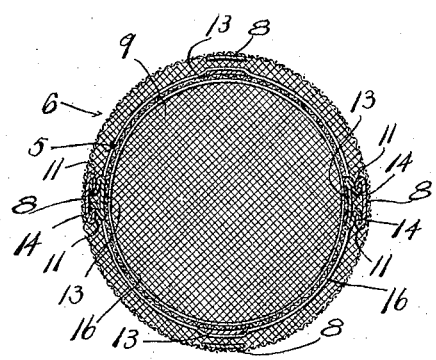

In the drawings:—Figure 1 is a side elevation of the strainer when in extended position. Fig. 2 is a similar view with the upper section of the strainer telescoped within the lower strainer. Fig. 3 is a vertical longitudinal sectional view through the strainer. Fig. 4 is a transverse sectional view on the line 4—4 of Fig. 2.

Similar reference characters indicate corresponding parts throughout the several views in the drawings.

Referring to the drawings by numerals, 5 and 6 designate the upper and lower sections of the strainer each of which is preferably of cylindrical shape and comprises a wire mesh body, although it may be formed of other foraminous material. The lower section 6, has secured in any suitable manner at diametrically opposite points thereof to its inner face vertical strips 8, the lower extremities of which extend below the bottom 9 of said section to form rests or leg terminals 10, so that when the strainer is placed within a receptacle the bottom of said section 6, is held elevated from the bottom of the receptacle. Each of the strips 8 is formed at opposite longitudinal edges with inwardly converging guide flanges 11, the purpose of which will be hereinafter described. Surrounding the upper edge of the section 6 and secured thereto is an annular reinforcing rib or band 12 which latter strengthens the said section and also serves as an abutment rim therefor.

At diametrically opposite points of the upper section 5, and secured exteriorly on the wire mesh body, are vertical strips 13, the same being formed with dovetail-shaped guide ribs 14, the latter adapted to engage between the guide flanges 11, of the strips 8, so as to permit the telescoping of the upper section 5, within the lower section 6, and in this manner the strainer may be lengthened or shortened for receiving a larger or smaller quantity of substance such as tea or coffee or other articles of food. Surrounding the upper open end of the section 5, is a rim or abutment band 15, the strips 13 abutting against said band 15. This rim or abutment band 15 is adapted to reinforce the upper end of the said section 5 of the strainer.

Disposed at the lower open end of the section 5 and suitably secured to the wire mesh body is an abutment band 16, which latter is adapted to contact with an abutment band 17, at the upper end of the section 6, when the said upper section has been pulled outward to its fullest extent from within the lower section. This abutment band 17 of the lower section is disposed against the inner surface of the wire mesh body and is cut away at the points of intersection of the strips 8 therewith. Thus it is obvious that these sections may telescope one within the other by having the upper section 5, pushed within the lower section 6, when shortening the strainer. Suitably secured to the upper open end of the upper section 5 are opposed loop handles 18, which latter permit of the handling of the strainer so that the same may be placed within or removed from a receptacle or cup.

It is obvious that this strainer may be used for cooking vegetables or other articles of food as well as coffee.

What is claimed is:—

In combination, a wire mesh section comprising a cylindrical body, strips secured interiorly to said body, said strips having their edges inturned, a second wire mesh section adapted to slide within the first section and comprising a wire mesh body cylindrical in form, strips secured longitudinally to said second body, said strips being formed with dovetailed ribs adapted to engage with the inturned edges of the strips of the first section, an abutment band mounted on the upper end of the first section and an abutment band mounted on the upper end of the second section adapted to contact with the first abutment band.

In testimony whereof, I affix my signature, in presence of two witnesses.

ANNA E. WALTON.

Witnesses:
P. F. FLANAGAN,
D. J. LAHIFF.

Copies of this patent may be obtained for five cents each, by addressing the "Commissioner of Patents, Washington, D. C."